(12) United States Patent
Chapon et al.

(10) Patent No.: US 9,149,003 B2
(45) Date of Patent: Oct. 6, 2015

(54) WEB WRAP APPARATUS

(75) Inventors: Emmanuel Chapon, Velet (FR);
Gresset Pascal, Pirey (FR)

(73) Assignee: DEERE & COMPANY, Moline, IL (US)

( * ) Notice: Subject to any disclaimer, the term of this patent is extended or adjusted under 35 U.S.C. 154(b) by 455 days.

(21) Appl. No.: 13/234,786

(22) Filed: Sep. 16, 2011

(65) Prior Publication Data

US 2012/0233963 A1 Sep. 20, 2012

(30) Foreign Application Priority Data

Sep. 16, 2010 (EP) .................................... 10177092

(51) Int. Cl.
*B65B 11/00* (2006.01)
*A01F 15/07* (2006.01)

(52) U.S. Cl.
CPC ........... *A01F 15/0715* (2013.01); *A01F 15/071* (2013.01)

(58) Field of Classification Search
CPC . A01F 15/0715; A01F 15/071; A01F 15/106; A01F 2015/076; A01F 2015/0745; A01F 2015/0755
USPC ...................... 53/203; 83/649; 225/25, 43, 51
See application file for complete search history.

(56) References Cited

U.S. PATENT DOCUMENTS

| | | | | |
|---|---|---|---|---|
| 2,815,906 A * | 12/1957 | Hofmeier | ......................... | 225/38 |
| 4,197,774 A * | 4/1980 | Singh et al. | ..................... | 83/374 |
| 4,922,690 A | 5/1990 | Gusewell et al. | | |
| 5,319,899 A * | 6/1994 | Jennings et al. | ................ | 53/118 |
| 5,709,143 A * | 1/1998 | Bentley | ............................. | 100/5 |
| 6,021,622 A | 2/2000 | Underhill | | |
| 6,725,753 B2 * | 4/2004 | Bell | ................................ | 83/175 |
| 6,886,307 B2 | 5/2005 | Viaud et al. | | |
| 2004/0016204 A1 | 1/2004 | Chow et al. | | |
| 2005/0205637 A1* | 9/2005 | Kazama | .......................... | 225/43 |
| 2010/0236190 A1* | 9/2010 | Paillet et al. | .................... | 53/203 |

FOREIGN PATENT DOCUMENTS

| | | |
|---|---|---|
| EP | 0432830 | 12/1994 |
| EP | 2113165 | 8/2011 |
| GB | 2145659 | 4/1985 |
| WO | 9718700 | 5/1997 |

OTHER PUBLICATIONS

European Search Report, Apr. 6, 2011, 3 pages.

* cited by examiner

*Primary Examiner* — Stephen Choi

(57) ABSTRACT

A web wrap apparatus is provided having a separator with a separating edge deflecting a web against a counter member to separate it. In or at the counter member, retainers are provided, which protrude the web and thus avoid that the web glides along the counter member toward its center area. Preferably the retainers are formed as teeth in a wall of an inverted V-shaped counter member.

8 Claims, 8 Drawing Sheets

WEB WRAP APPARATUS

FIELD OF THE INVENTION

This invention relates to a web wrap apparatus with a separator having a separating edge and a counter member.

BACKGROUND OF THE INVENTION

From EP 2 113 165 it is known, to have a so-called duckbill feeder with a toothed top plate resting on a bottom plate to clamp net between them, whereas the net is caught by the teeth and presses the top plate down. The top plate is not spring biased, since this makes it easier to insert a new net, when a roll of net is used up.

EP 432 830 also discloses a duckbill for feeding net into a gap between two rolls of a bale chamber. This mechanism contains two moveable plates pressed against each other to hold net between themselves. The leading edges of both plates are provided with teeth or recesses to create a way of protruding into the net and holding it tight. The bottom plate is pressed by way of a spring against the underside of the top plate to clamp the net.

The problem this invention is based on is seen in the need to keep both plates pressed against each other to hold the net against sideward movement, whereas such clamping has the disadvantage that it becomes difficult to insert the net into the nip between the plates, when a new roll of net is used. Another problem is that the net may be destroyed by the leading edge of the plate, when it is deflected for the cutting operation. If as an alternative one of the plates is not spring applied and is able to pivot freely, it is disadvantageous in that it may hit a rotating roll that is part of the bale chamber wall, when the duckbill enters a gap between rolls of the bale chamber. Furthermore, if the plate is free to pivot, the net will not be caught by fingers or the like on one of the plates and the net may move and will be cut unevenly.

SUMMARY OF THE INVENTION

By providing retainers at the counter member, the web contacts them only when it is ready for cut, rather than when being deflected towards the counter member. The retainers in at least the side or lateral areas will assure, that the net does not move to the center of the separating device. As a result the net will end substantially on a line rectangular to its lengthwise extension and will be gripped by the bale equally when it is fed into the bale chamber next time. The retainers may be teeth, hooks, protrusions, ramps, or any other element counteracting a movement of the web. These retainers may be fixed or moveable and become active only during or shortly before the cutting process. The location of the retainers may have an influence on the cutting process in so far, as the web may be cut in areas without retainers earlier than in areas with retainers, if the retainers are part of the counter knife and shearing happens only when the net reaches the bottom of the retainers.

When the net is pressed into a corrugation in the counter member, the net cannot deflect and will be cut immediately.

The net will not be destroyed by the retainers, or at least not more than necessary, if the retainers are provided in a wall of the corrugation, which is hit by the net only very shortly before cutting happens. The location and selection of the wall depends on the run of the web on its way to the separating device.

While it is preferable to have the retainers integrated into the counter member, they can as well be individual parts, located close to the counter member, like on a sheet metal or bar, etc.

BRIEF DESCRIPTION OF THE DRAWINGS

The preferred embodiments of the invention are described in detail below with reference to the accompanying drawings wherein.

DESCRIPTION OF THE PREFERRED EMBODIMENT

Figure 1:
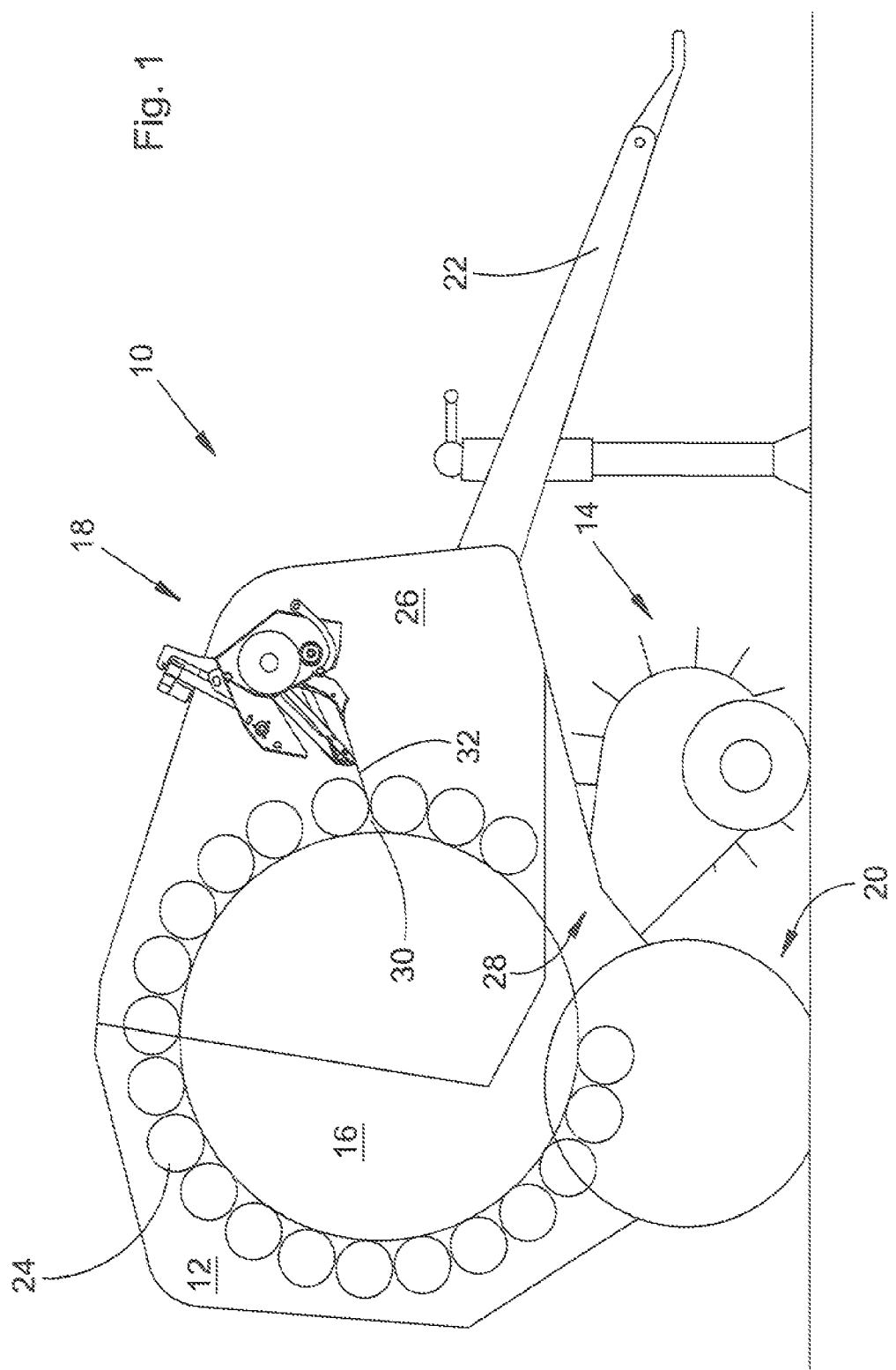
FIG. 1 is schematic side view of a round baler provided with a web wrap apparatus.

FIG. 1 shows a round baler 10, which has a chassis 12, a pick-up 14, a bale chamber 16, a web wrap apparatus 18, an axle with wheels 20, a tongue 22 and baling elements 24.

The round baler 10 is of an ordinary kind in a fixed chamber configuration, but could also be a variable chamber baler.

The chassis 12 rests on the axle with wheels 20, carries the pick-up 14 and can be connected to a tractor or the like by way of the tongue 22. The chassis 12 has one or multiple part side walls 26, which are spaced apart from one another to receive between them the bale chamber 16, all or part of the web wrap apparatus 18 and the baling elements 24.

The pick-up 14 picks up crop from the ground and delivers it to the bale chamber 16 through a crop inlet 28 between the baling elements 24.

The bale chamber 16 is covered substantially by the baling elements 24 on the circumference and by the side walls 26 on the face side. Beside the crop inlet 28 a gap 30 is provided between the baling elements 24, through which a web 32 may be fed into the bale chamber 16. The bale chamber 16 serves to form a cylindrical bale of hay, straw or the like, which will be covered by the web 32 of plastic, net, paper or the like. The baling elements 24 in this embodiment are in the form of steel rolls rotatably received in the sidewalls 26 and extending perpendicular to them. These baling elements 24 are arranged substantially on a circle.

Figure 2:
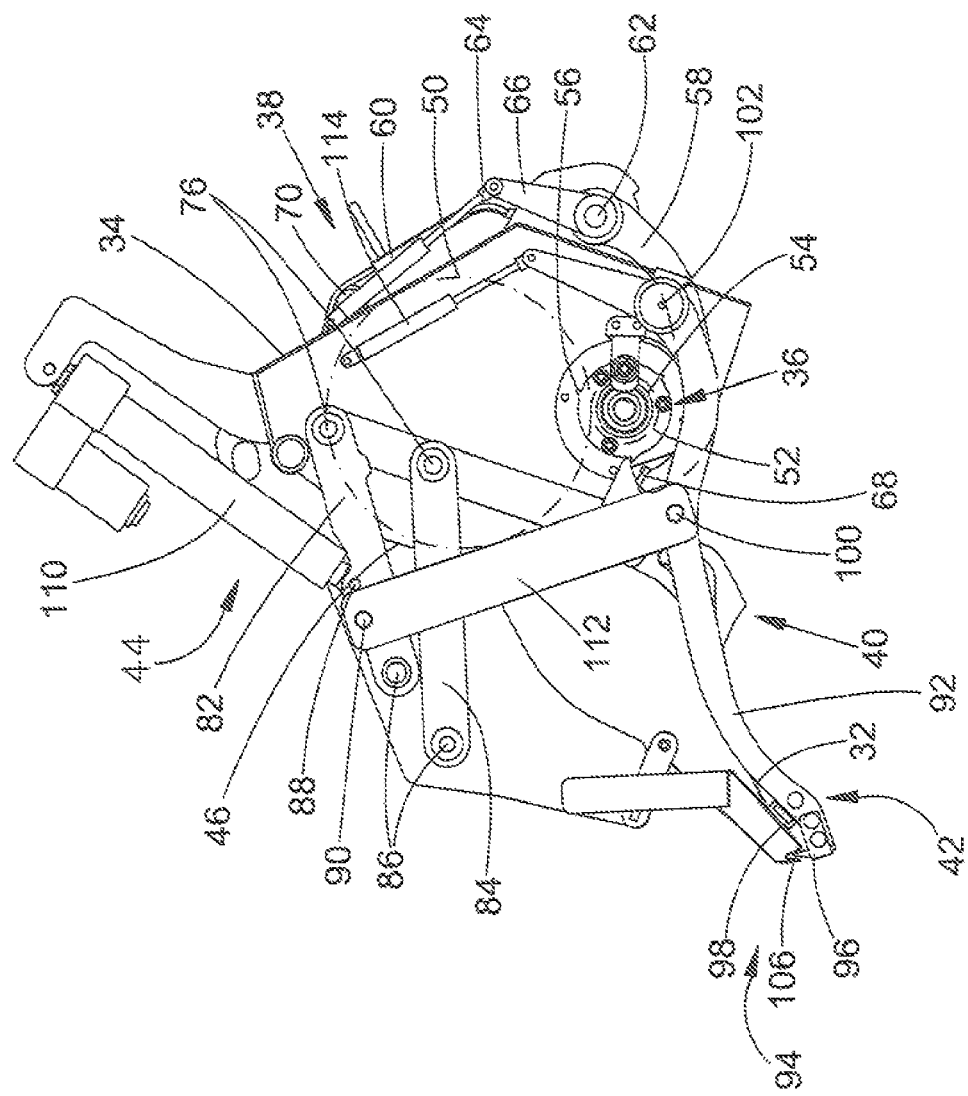
FIG. 2 is the web wrap apparatus of FIG. 1 depicted in a waiting position.

The web wrap apparatus 18 is visible in more detail in FIG. 2 and contains among other things a housing 34, a motion element 36, a brake device 38, a feeder 40, a separator 42 and an actuating mechanism 44.

The housing 34 is located in the front upper part of the round baler 10 between or substantially between the side walls 26 and has a rear wall 46 and a left and a right wall 48 connected to one another and suitable to be connected to the side walls 26. Depending on the width of the web 32, the housing 34 and the entire web wrap apparatus 18 may extend beyond the side walls 26. The rear wall 46 may be made of a material, or may have a layer, which creates a certain friction, which will have an influence on the rolling resistance of a roll 50 of the web 32. The housing 34 may be used to attach all components and parts of the web wrap apparatus 18 to it to form an autonomous unit. The right and left walls 48 extend to the rear towards the bale chamber 16 as needed to take up some of the parts described later.

The motion element 36 is formed by a roll 52, preferably rubber coated, which is journalled rotatably about a horizontal axis in the walls 48 and which is located such, that the roll 50 of the web 32 can rest on it. At least with one end portion the roll 52 extends beyond the walls 48 and possibly even beyond the side walls 26 and is provided with a yieldable clutch 54, which may be a slip clutch, a rubber block between a flange and the roll 52 or the like. The clutch 54 has several—in this case three—actuators 56 evenly distributed on the circumference of a disc rotating with it; although one would be sufficient. The actuators 56 may be stops, noses, or the like protruding radially, but may also be grooves or notches in the circumference. When viewing the drawing, the roll 52 has about the same diameter as the clutch 54. As is known in the art, but not shown here, the roll 52 is connected via a chain drive and a free-wheel to the baling elements 24 such, that it must rotate slower than the baling elements 24.

The brake device 38 substantially has a control arm 58 and a brake arm 60 connected together on a shaft 62 to pivot about a horizontal axis of the latter. Also a gas spring 64 is connected to the shaft 62 via an arm 66 to assist or resist its rotational movement. It is the purpose of the brake device 38 to exert a certain pressure on the roll 50 of the web 32 to assure a sufficient tension in it, when it is wrapped onto a bale (not shown). The shaft 62 is located at about the same height as the roll 52 and at a certain distance to it forwardly. The control arm 58 extends underneath the roll 52 to a side opposite to the shaft 62 and ends at about the center of the roll 52. The control arm 58 has an idler bar 68 or an angle extending parallel to the axis of roll 52 between the walls 48. The brake arm 60 extends from the shaft 62 to a location above a completely wrapped roll 50 of the web 32 and has a cross element 70 designed to push onto the circumferential surface of the roll 50, thereby pressing the roll 50 against the rear wall 46 and creating the wanted rolling resistance. As is apparent from the drawing, a downward, counter-clockwise movement of the control arm 58 will provoke a counter-clockwise movement of the brake arm 60 upon the roll 50 of the web 32.

Figure 3:
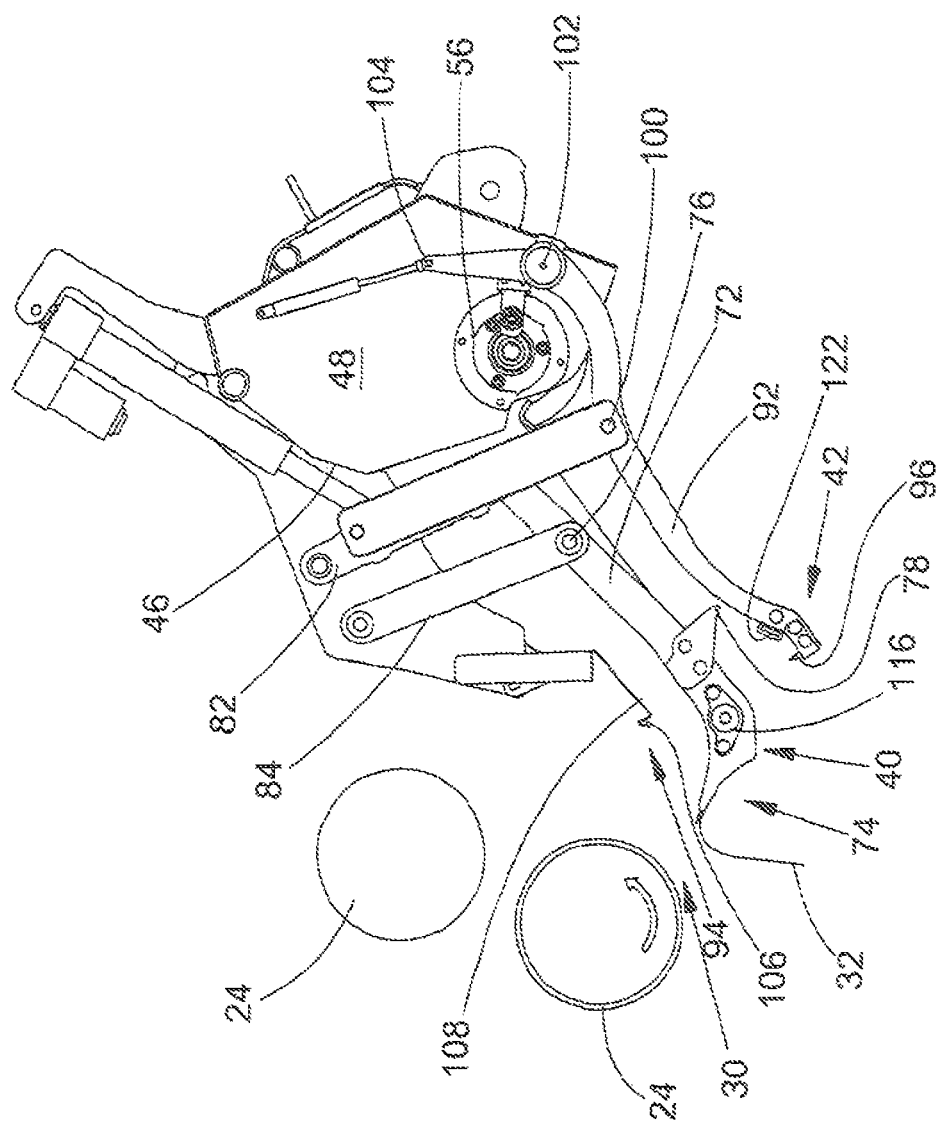
FIG. 3 is the web wrap apparatus FIG. 1 depicted in an intermediate position.

The feeder 40 in this embodiment (see also FIG. 3) is formed as a so-called duckbill, which is not mandatory; it could be any other moving part pulling the web 32 from the roll 50 and feeding it into the bale chamber 16 through the gap 30. The feeder 40 is composed of a strut 72 on each side holding between them a carrier 74 in the form of a mouthpiece at a lower end thereof, two vertically distant bearings 76 in an upper region and a driver 78 positioned between the carrier 74 and the lower bearing 76 at the side of the strut 72 opposite of the carrier 74. The carrier 74 as such is known and has two opposite plates biased onto each other during feeding movement to clamp a piece of the web 32 and move it forward; reference is made to the disclosure of EP 2 113 165 A1, which is incorporated by reference herein. An upper link 82 and a lower link 84 forming part of a parallelogram linkage are connected with one end area to the bearings 76 and with their other end areas to the bearings 86 on the walls 48 being offset horizontally as well as vertically; lines through the bearings 76 at one end and the bearings 86 at the other end do not run parallel but divergently. The upper link 82 has an eye 88 on its upper side or a bore or the like useful to provide a connection to another part, as well as a journal 90, which in this case, but not necessarily, is located between the eye 88 and the bearing 86. An idler element 116 is connected to and connects struts 72 on both sides and is provided between the carrier 74 and the driver 78. As can be seen in FIG. 3 this idler element 116 assists in feeding the web 32 in a proper way into the carrier 74. The idler element 116 may consist of a simple bar or shaft.

The separator 42 has two substantially S-shaped, but almost horizontally oriented arms 92 and a counter element 94, which both serve to cut or separate a portion of the web 32 wound around a bale from a portion remaining on the roll 50. In their rear end areas, shown at the left in the drawing and facing the bale chamber 16, the arms 92 carry an upwardly oriented separating edge 96 or knife and a rubber block 122, which is oriented the same way, but provided with respect to the separating edge 96 opposite of the bale chamber 16 and which forms one part of a retainer 98. A bearing 100 is located substantially in the transition area between the two curves of the "S" and is followed by a bearing 102 at about ⅔ of the remaining length of the second curve and a bearing 104 at the end of the arms 92. The counter element 94 is formed of bent sheet metal, which in this case is flexible to some extent and has a notch 106, into which the separating edge 96 may enter and a plate 108 or surface, which is positioned such, that it can be contacted by the rubber block 122, when the separator 42 is moved against it. The counter element 94 is attached to the walls 48 and located close to the gap 30. The plate 108 forms another part of the retainer 98.

The actuating mechanism 44 includes a motor 110, a link 112 and a spring 114. The motor 110, which may be actuated electrically, hydraulically or pneumatically is connected with one side to the walls 48 or any other stationary feature of the chassis 12 and with the other side to the eye 88 on the upper link 82. The link 112 is a straight rigid bar extending between and connecting the bearings 90 on the upper link 82 and the bearing 100 on the arms 92. The spring 114 is formed as a gas spring, but could be of any other kind, and is connected at one end to the walls 48 and at the opposite end to the bearing 104 at the end of the arms 92.

Connected to the clutch 54 and thus to the roll 52 are three indicators rotating with the roll 52, once the web 32 is pulled from the roll 50. A sensor 126 is located close to the travel path of these indicators to sense their movement. These indicators are offset angularly with respect to the actuators 56.

Figure 7:
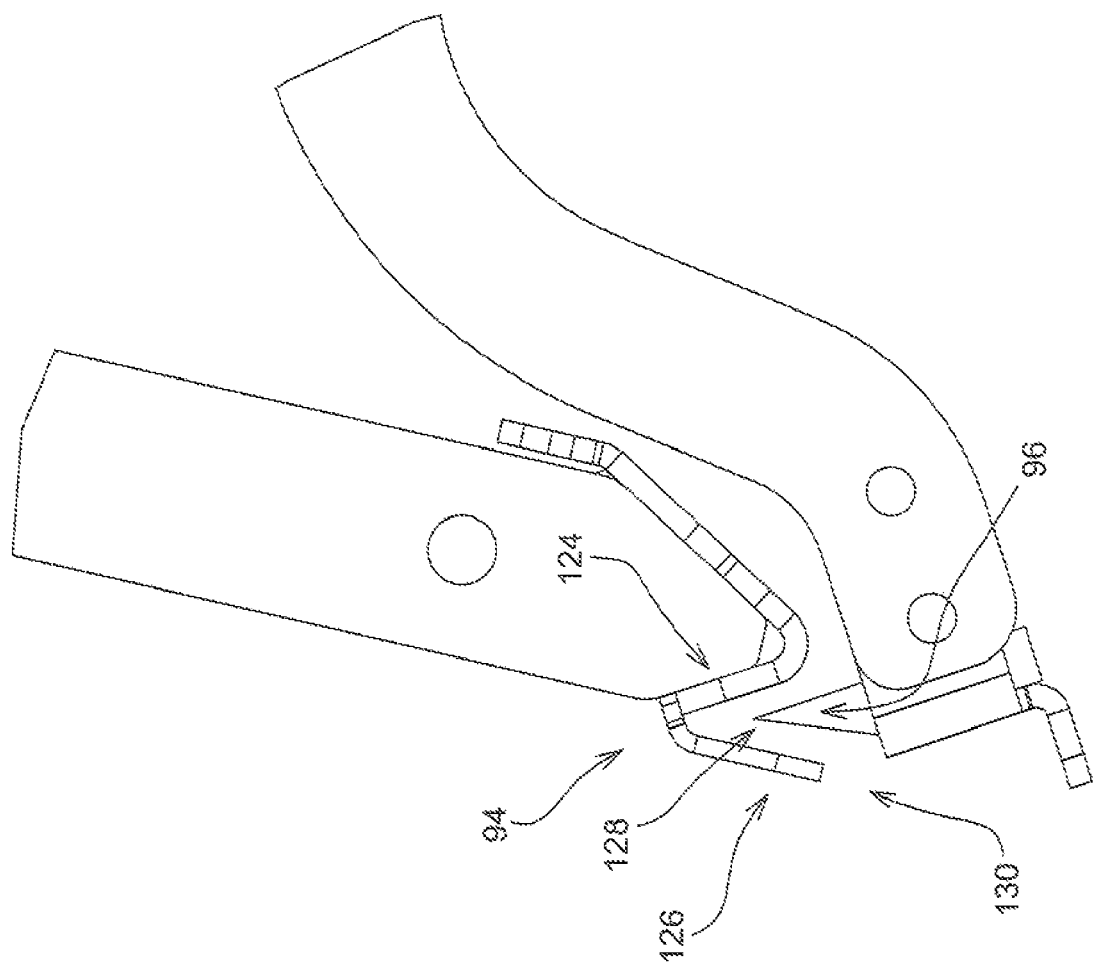
FIG. 7 is a separator depicted in a cutting situation.
Figure 8:
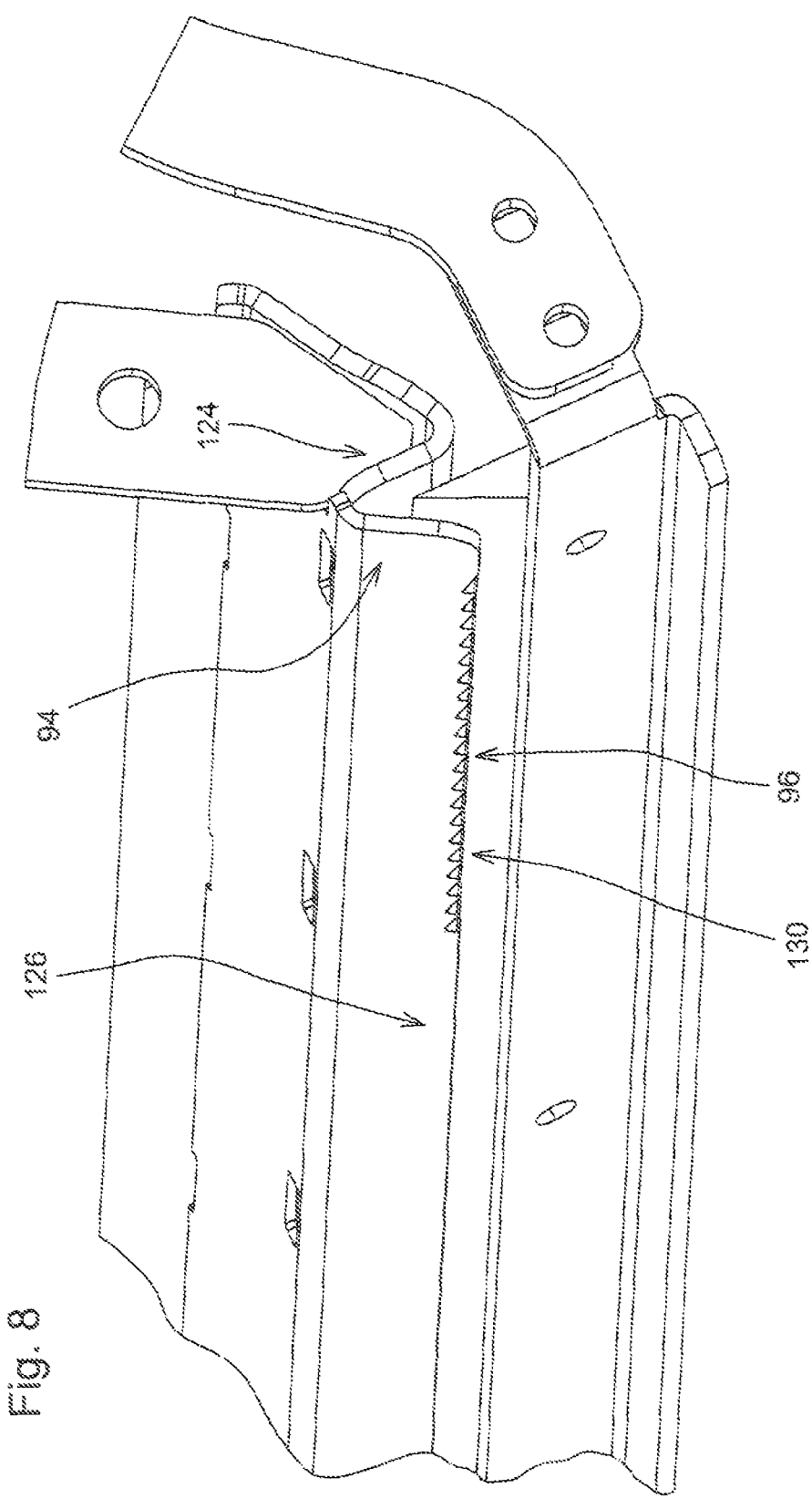
FIG. 8 is a rear view of the separator.

FIG. 7 shows in elevation and side view the counter member 94 and the separating edge 96, both running parallel to each other. As shown, the counter member 94 is of an inverted V-shape, having a front and a rear wall 124, 126 respectively both being fixed to the left and right wall 48 and extending across the bale chamber 16 and the web 32 fed into it. The wedge shaped separating edge 96 with the web 32 bent over it, fits into a valley 128 formed between the two walls 124, 126. If a straight line is drawn between the circumference of the baling elements 24 above the gap 30 and the end of the feeder 40 it becomes apparent, that the web 32 extending along this line and deflected by the separating edge 96 first will hit the front wall 124 and later the rear wall 126. The rear wall 126 (see FIG. 8) is provided in its lateral end areas with retainers 130 being formed as teeth, whereas each end area assumes a length of about 15 to 25% of the length of the walls 124, 126. The retainers 130 are oriented such, that they resist a movement towards a center area of the walls 124, 126. Looking at FIG. 7, it is apparent, that the web 32 in the lateral end areas can enter the recesses between the teeth 130 and is exposed to the cutting force of the separating edge 96 later, than the center area having no teeth. In prior art balers the web often is cut first at the outer areas, because the separating edge and/or the counter member bend slightly under the pulling force of the net in their middle section. The solution taught here provides for an even cut along the entire length of the separating edge 96 and avoids that the web 32 moves towards the center. When the next bale is ready to be wrapped, the web 32 is grasped by the bale uniformly across the entire width of the bale.

Based on this structural description the function is described as follows, starting from a state shown in FIG. 2, in which the web wrap apparatus 18 waits to be operated. In a state as shown in FIG. 2, the roll 50 with the web 32 is placed on the roll 52 and is secured in its position between the cross element 70 and the rear wall 46. The arms 92 rest against the counter element 94 and the feeder 40 is in a position remote from the gap 30. The web 32 extends from the roll 50, underneath the roll 52 over the idler bar 68, through the carrier 74 to a location between the separating edge 96 and the notch 106, whereas it is clamped between the plate 108 and the rubber block 122 at a place slightly upstream of it. The driver 78 rests against the actuator 56 to keep the roll 52 against rotating.

Figure 4:
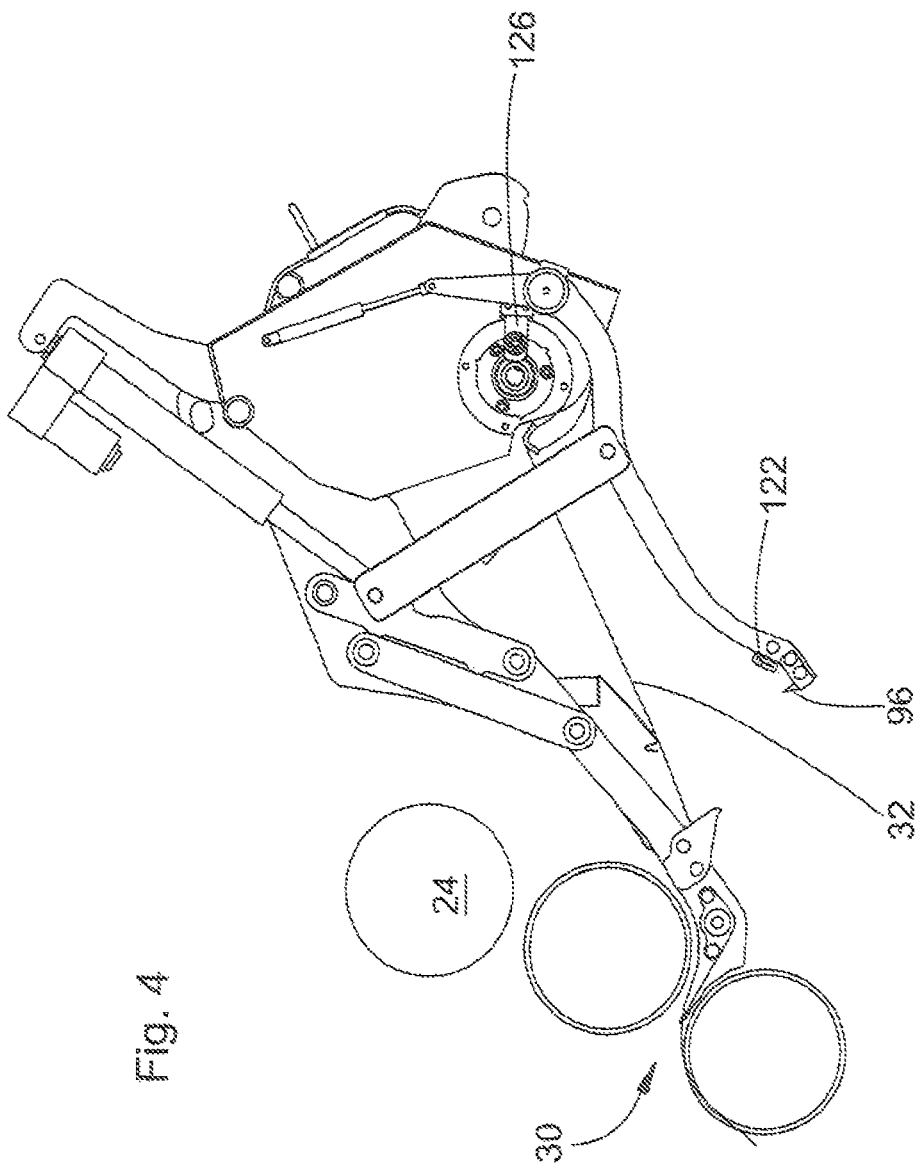
FIG. 4 is the web wrap apparatus FIG. 1 depicted in a feeding position.
Figure 5:
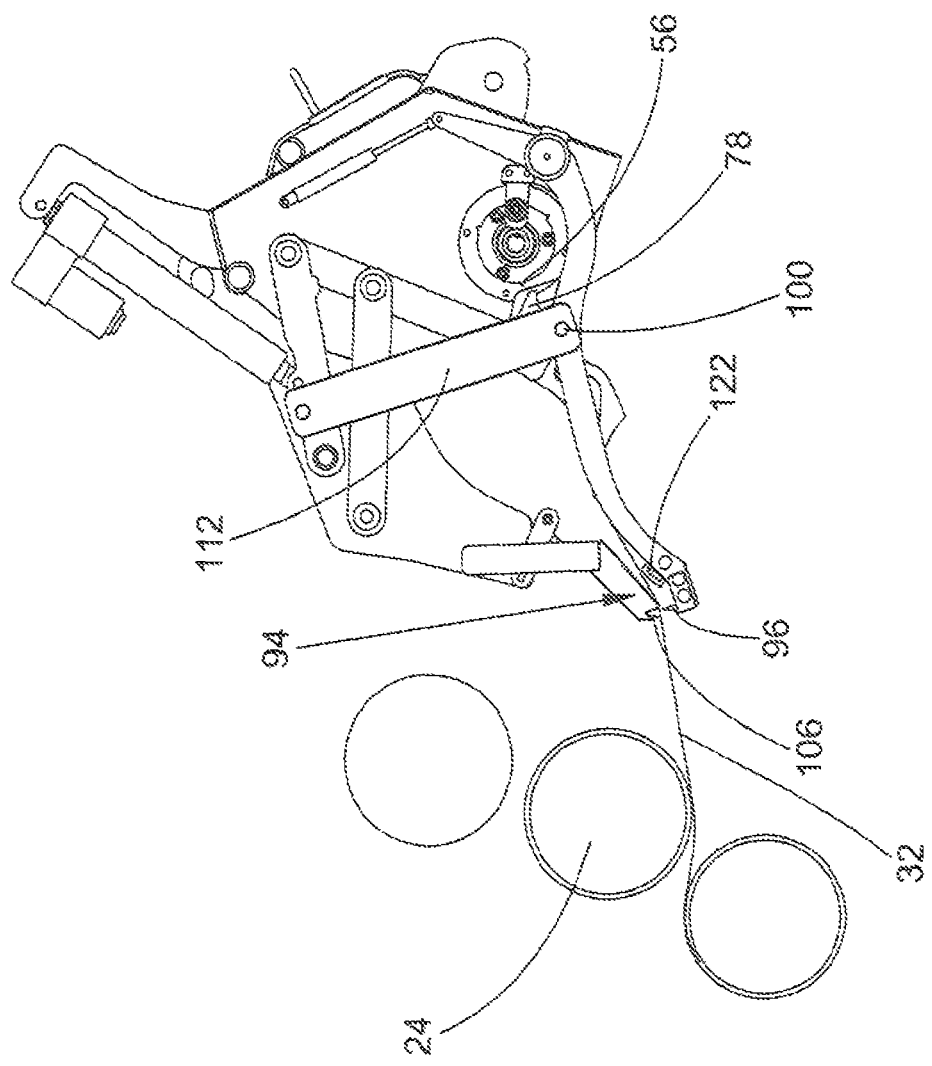
FIG. 5 is the web wrap apparatus FIG. 1 depicted in a partly retracted position.
Figure 6:
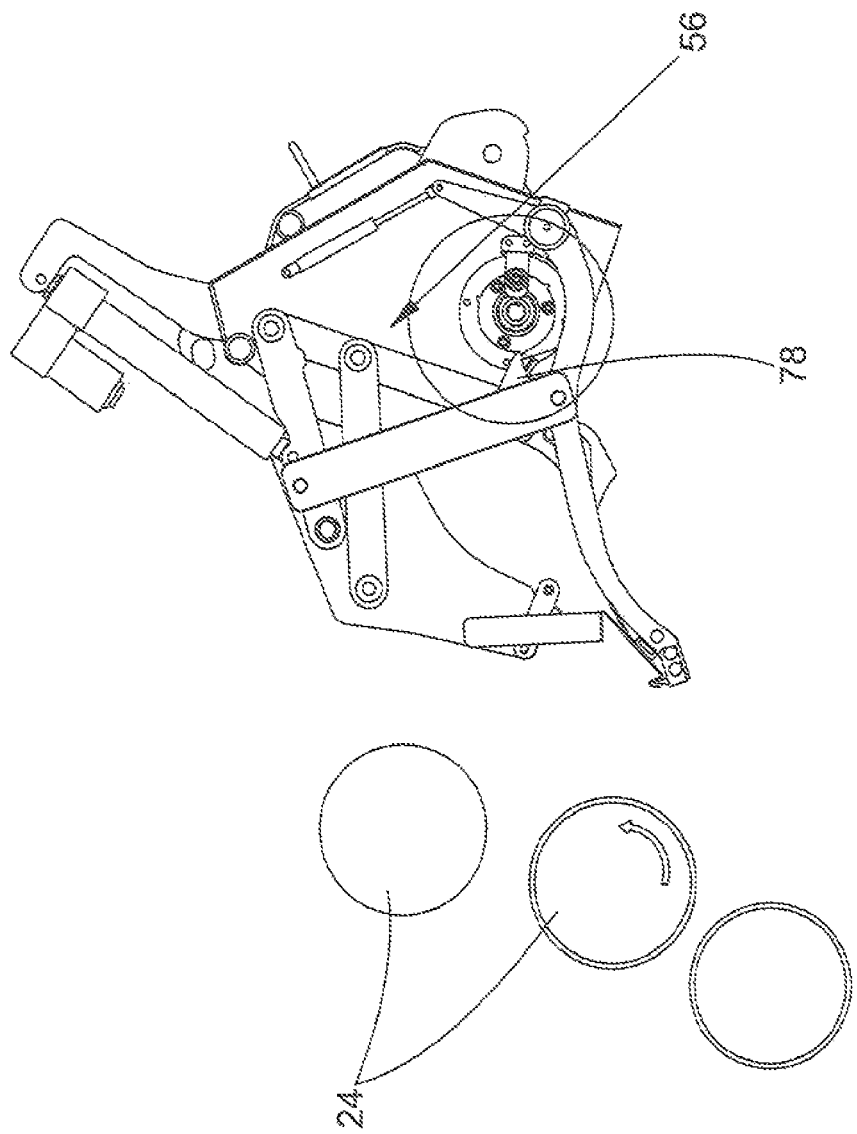
FIG. 6 is the web wrap apparatus FIG. 1 depicted in a fully retracted position.

As soon as a manual or electrical signal is given to the actuating mechanism 44 to initiate wrapping the web 32 around a bale, the motor 110 is extended, thereby moving the arms 92 away from the counter element 94, moving the feeder 40 downward and towards the gap 30, which releases the driver 78 from the actuator 56. FIG. 3 shows, that the separator 42 moves away sufficiently to allow the feeder 40 to enter the gap 30. Once the carrier 74 protrudes the gap 30, the web portion hanging down from the carrier 74 is caught by the rotating bale and pulled from the roll 50. Tension is created in the web 32, since the roll 50 experiences friction on the wall 46 and since the roll 52 is hindered from free movement. According to FIG. 4 the web 32 is inserted into the gap 30 and caught by the rotating bale. FIG. 5 shows a situation, in which the motor 110 is retracted and thereby the feeder 40 is on its way back to a resting position and the driver 78 approaches the actuator 56. The dimensions, locations and arrangements of the feeder 40 and the separator 42 are chosen such, that in the situation of FIG. 5, shortly before the web 32 is separated, the web 32 is pulled over the rubber block 122 at one side and over the counter element 94 on its other side, but not or hardly over the tip of the separating edge 96. This helps to avoid unnecessary wear on the separating edge 96, premature tearing of the web 32 and thus achieves a clean cut or separation of the web 32. As a next step the driver 78 engages the actuator 56, which rotates together with the roll 52. As a result the link 112 is abruptly kicked upwardly, which assists the upward movement of the arms 92 initiated by the motor 110, and the spring 114. In order to dampen the shock on the roll 52 either the clutch 54 allows a slipping movement or if the clutch 54 contains rubber blocks or the like, the driver 78 will be even accelerated by the first compressed and then expanding rubber. As a further consequence and as is shown in FIG. 6 the accelerated separating edge 96 presses the web 32 into the notch 106 and clamps it as well between the rubber block 122 and the plate 108, which increases tension in the web portion connected to the bale and finally leads to its separation. During the separation the web 32 cannot move towards the center of the separating edge 96, as it is kept in the lateral end areas by the retainers 130. The piece of the web 32 extending from the separating edge 96 to the carrier 74 is the one hanging down, when wrapping starts again.

Having described the preferred embodiment, it will become apparent that various modifications can be made without departing from the scope of the invention as defined in the accompanying claims.

The invention claimed is:

1. A web wrap apparatus for providing a web from a roll to a bale and separating the web, the web wrap apparatus comprising a feeder having an extended position to provide web to the bale and a retracted position, a brake device which exerts pressure on the roll creating tension in the web as it wrapped onto the bale, a separator with a separating edge and a block, the block and the roll operable to place the web under tension as it is separated, the web wrap apparatus further comprising a counter member, wherein at least in lateral end areas of the counter member, retainers are provided to resist movement of the web towards a center area of the counter member, the feeder located forward of the separator in the extended position and behind the separator in the retracted position.

2. The web wrap apparatus of claim 1, wherein the counter member is formed as a corrugation with a valley to receive the separating edge and adjacent walls.

3. The web wrap apparatus of claim 2, wherein the retainers are provided in the wall, which in the cutting process is contacted latest by the web.

4. The web wrap apparatus of claim 1, wherein the retainers are separate from the counter member.

5. The web wrap apparatus of claim 2, wherein the retainers are separate from the counter member.

6. The web wrap apparatus of claim 3, wherein the retainers are separate from the counter member.

7. The web wrap apparatus of claim 1, wherein the retainers comprise teeth.

8. The web wrap apparatus of claim 1, wherein the retainers are provided only in the lateral end areas of the counter member.

* * * * *